United States Patent [19]
Zeigler

[11] Patent Number: 5,651,228
[45] Date of Patent: Jul. 29, 1997

[54] FAMILY OF COLLAPSIBLE STRUCTURES AND A METHOD OF MAKING A FAMILY OF COLLAPSIBLE STRUCTURES

[75] Inventor: Theodore R. Zeigler, Alexandria, Va.

[73] Assignee: World Shelters, Inc., Alexandria, Va.

[21] Appl. No.: 600,369

[22] Filed: Feb. 13, 1996

[51] Int. Cl.⁶ .................................................. E04H 12/18
[52] U.S. Cl. ........................... 52/646; 52/648.1; 52/118; 52/645; 52/81.1; 135/108
[58] Field of Search .................................. 52/646, 648.1, 52/108, 118, 645, 81.1; 135/108

[56] References Cited

U.S. PATENT DOCUMENTS

| | | | |
|---|---|---|---|
| 4,074,477 | 2/1978 | Runyon | 52/646 X |
| 4,437,275 | 3/1984 | Zeigler | 52/646 X |
| 4,475,323 | 10/1984 | Schwartzberg et al. | 52/645 X |
| 5,230,196 | 7/1993 | Zeigler | 52/646 |
| 5,371,983 | 12/1994 | Kawaguchi et al. | 52/81.1 |
| 5,379,557 | 1/1995 | Kotter | 52/81.1 |
| 5,444,946 | 8/1995 | Zeigler | 52/646 X |

*Primary Examiner*—Wynn E. Wood
*Assistant Examiner*—W. Glenn Edwards
*Attorney, Agent, or Firm*—Burns, Doane, Swecker & Mathis, LLP

[57] ABSTRACT

In a family of collapsible structures, each collapsible structure has a collapsible beam. For each collapsible structure of the family of collapsible structures, the collapsible beam includes a plurality of curved strut pairs of the same length as the curved strut pairs as in every other collapsible structure of the family of collapsible strut pairs. The struts of each curved strut pair are pivotally connected to each other at points closer to the one end of the struts than the other end of the struts. Different collapsible structures of the family of collapsible structures have a different number of curved strut pairs than any other collapsible structure of the family of collapsible strut pairs.

13 Claims, 4 Drawing Sheets

FAMILY OF COLLAPSIBLE STRUCTURES AND A METHOD OF MAKING A FAMILY OF COLLAPSIBLE STRUCTURES

FIELD OF THE INVENTION

The present invention relates to collapsible structures and, more particularly, to a family of collapsible structures, and a method of making same.

BACKGROUND AND SUMMARY

In my prior U.S. Pat. No. 5,230,196, which is incorporated by reference, I disclosed various collapsible structures and parts therefor that involve the use of pairs of struts, the struts of the pairs of struts both being pivotally connected to each other, and the pairs of struts being pivotally interconnected to other strut pairs, end to end, to create elongated collapsible beams. The beams formed by such interconnected strut pairs may be curved or straight, as desired, and may have straight and curved portions, as desired. I have formed a straight beam, or portion thereof, with strut pairs having two same-length struts that are connected to each other substantially at their centerpoints so that the ends of the struts define a square or rectangle. I have formed a curved beam, or portion thereof, with strut pairs having two same-length struts that are connected to each other at points equally offset from the centerpoint of the struts, so that a polygon defined by ends of the struts has two opposed parallel sides, and two opposed non-parallel sides that form an angle relative to one another.

In such collapsible structures, at the ends of the beams formed with a plurality of strut pairs, it is desirable for the ends of the struts of the two outermost strut pairs on the beam to lie substantially along the same line. In this way, the ends of the collapsible beam lie along the ground or other surface. It is, however, undesirable to cut a strut pair in order to provide this feature, such that the collapsible beam is not formed of a whole number of strut pairs. In order to provide a beam having ends that lie substantially along the same line, I use a whole number of curved strut pairs in my collapsible beam, with the number of strut pairs being determined by the angle formed by the ends of the curved strut pairs. For example, if the curved strut pairs have ends that form an angle of 30°, I use six curved strut pairs in my collapsible beam, if the curved strut pairs have ends that form an angle of 90°, I use two curved strut pairs in my collapsible beam. I prefer to use between six and twenty curved strut pairs in a collapsible beam, but can adapt my beam to use more or fewer curved strut pairs, if desired or necessary.

Collapsible structures have a wide range of uses, such as personnel shelter and aircraft hangers, and, accordingly, are desired in a wide range of sizes. In the past, when it has been necessary to provide a different size of collapsible structure, all new tooling, such as fixtures and jigs, and parts, such as straight and curved struts, had to be provided. The amount that the pivotal connection of the struts of a particular curved strut pair for a particular collapsible structure was offset from the centerpoint of those struts was selected on a case by case basis. The ends of the strut pairs along the collapsible beam are ordinarily locked together in a spaced relation by a locking member. The length of the locking member would be determined as a function of factors including the amount of the offset pivot connection, the length of the struts, and the angle desired to be defined by ends of the curved strut pairs. My prior U.S. Pat. Nos. 5,444,946, 5,274,980, 4,761,929, 4,437,275, 4,473,986, 3,968,808, and Re. 33,7190 are representative of the different structures that can be formed with interconnected struts, and of the various parts that may be incorporated in such structures, and are incorporated by reference.

I have now recognized, however, that it is possible, in collapsible structures of different sizes, to use the same general style of straight strut pairs and curved strut pairs, with the lengths of the struts all being the same and, for each curved strut pair of each collapsible structure of all of the different sizes of collapsible structures, the amount of offset of the pivotal connection of the curved strut pairs being the same. For example, in a collapsible beam formed entirely of curved strut pairs, where all of the curved strut pairs include two struts of the same length pivotally connected to one another at the same distance from the centerpoint of the struts, the length and height of the collapsible beam may be varied by providing an additional number of curved strut pairs, and by providing locking members of different lengths. If desired or necessary, additional straight strut pairs may be provided in the beam. While it may be desired to use struts having greater diameters for enhanced structural strength in collapsible beams used on larger collapsible structures, all struts may be cut to the same length, and the position of all the pivotal connection on all curved strut pairs may be kept the same. This simplifies the design of different collapsible structures, and reduces the amount of tooling necessary to produce different collapsible structures.

In accordance with one aspect of my invention, a family of collapsible structures, each collapsible structure having a collapsible beam, is provided. For each collapsible structure of the family of collapsible structures, the collapsible beam includes a plurality of strut pairs, each of the strut pairs including a first and a second strut pivotally connected to each other. The first and second struts each have a first end and a second end and are of the same length. The first ends of the first and second struts and the second ends of the first and second struts are moved closer to each other when the collapsible beam is moved toward a collapsed condition. The first ends of the first and second struts of all of the strut pairs are releasably connected in spaced relation by locking members to the second ends of the second and first struts, respectively. One or more strut pairs of the plurality of strut pairs are curved strut pairs. The first and second struts of each curved strut pair are pivotally connected to each other at points closer to the first ends of the first and second struts than the second ends of the first and second struts. Ends of first and second struts of strut pairs at opposite ends of the beam define four substantially aligned points. For different collapsible structures of the family of collapsible structures, each different collapsible structure has a different number of curved strut pairs than any other collapsible structure of the family of collapsible structures.

According to another aspect of my invention, a method of making a family of collapsible structures is disclosed. According to the method, first and second struts of a number of the curved strut pairs are pivotally connected so that the curved strut pairs are pivotally connected at points closer to the first ends of the first and second struts than the second ends of the first and second struts, the number of curved strut pairs corresponding to the type of collapsible structure of the family of collapsible structures being made.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION OF THE PREFERRED EMBODIMENTS

Figure 1:
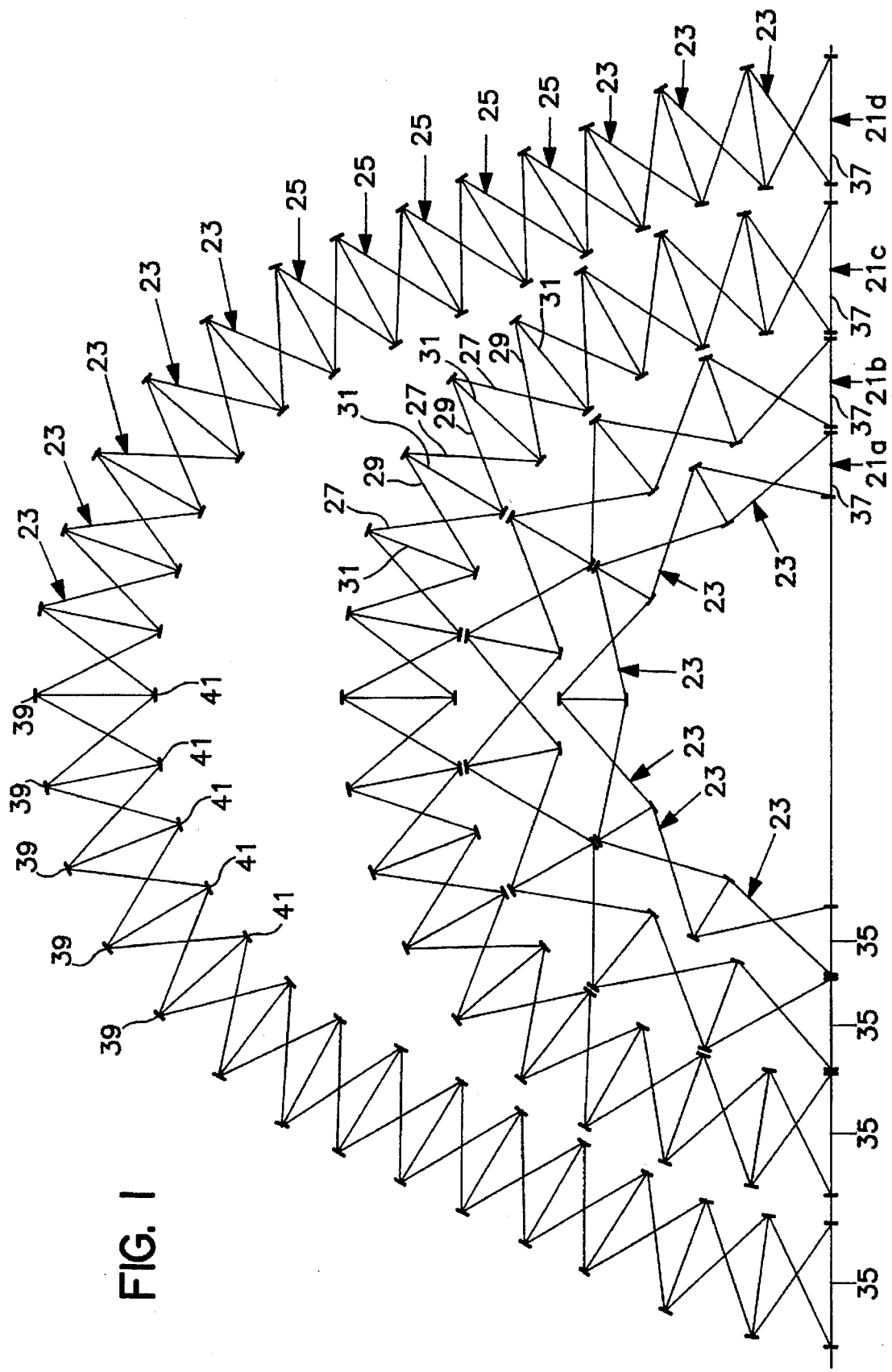
FIG. 1 is a schematic, cross-sectional view of portions of different collapsible structures of a family of collapsible structures according to an embodiment of the present invention.

Portions of different collapsible structures of a family of collapsible structures, and having collapsible beams 21a, 21b, 21c, and 21d, respectively, according to my invention are shown superimposed over one another in FIG. 1. The beams are different in size from one another and each include one or more curved strut pairs 23. The beam 21d is shown as being formed from a plurality of curved strut pairs 23 as well as a plurality of straight strut pairs 25.

Figure 2A:
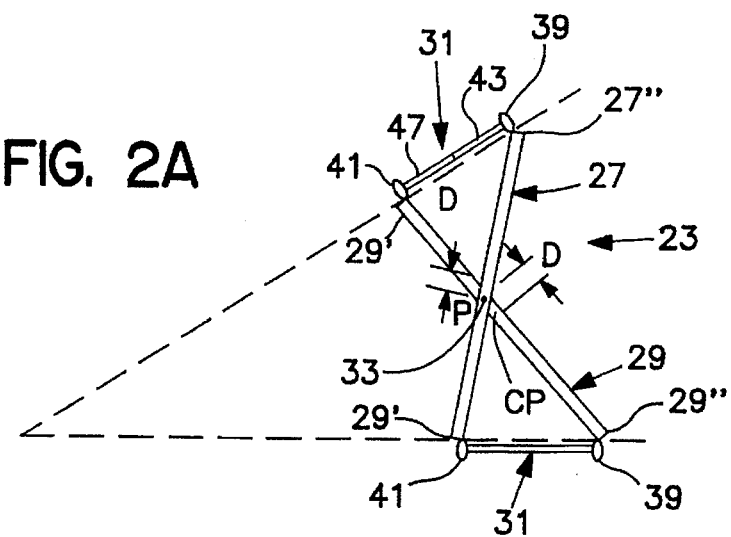
FIGS. 2A, 2B, 2C, and 2D are schematic views of a curved strut pair according to an embodiment of the present invention, FIGS. 2A, 2B, and 2C showing the same curved strut pair forming first, second, and third curved strut pairs, respectively, and FIG. 2D showing the curved strut pair in a fully closed or collapsed position.
Figure 2B:
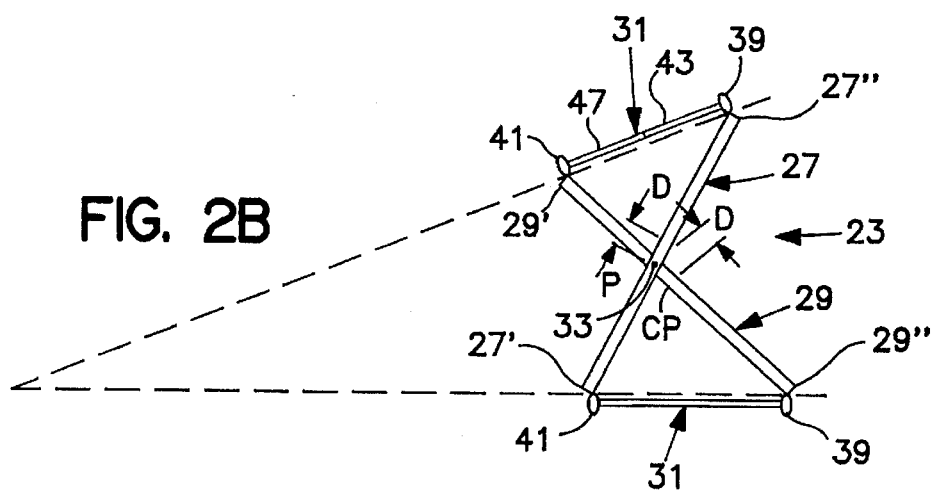
Figure 2C:
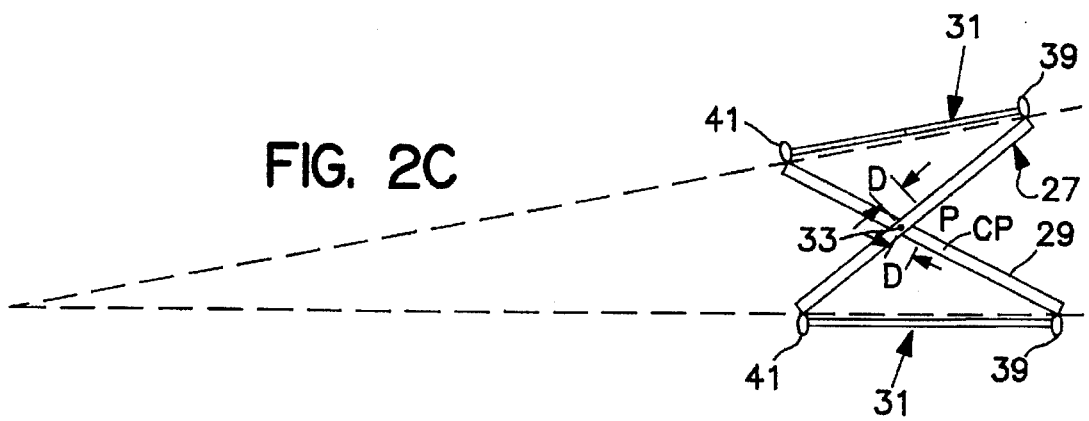
Figure 2D:
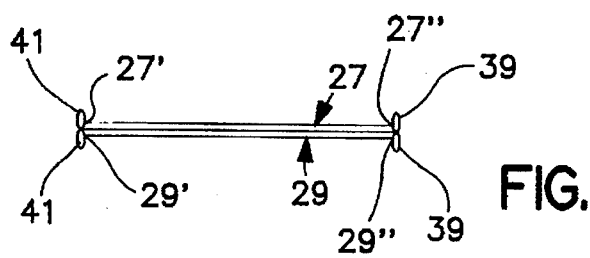
Figure 3:
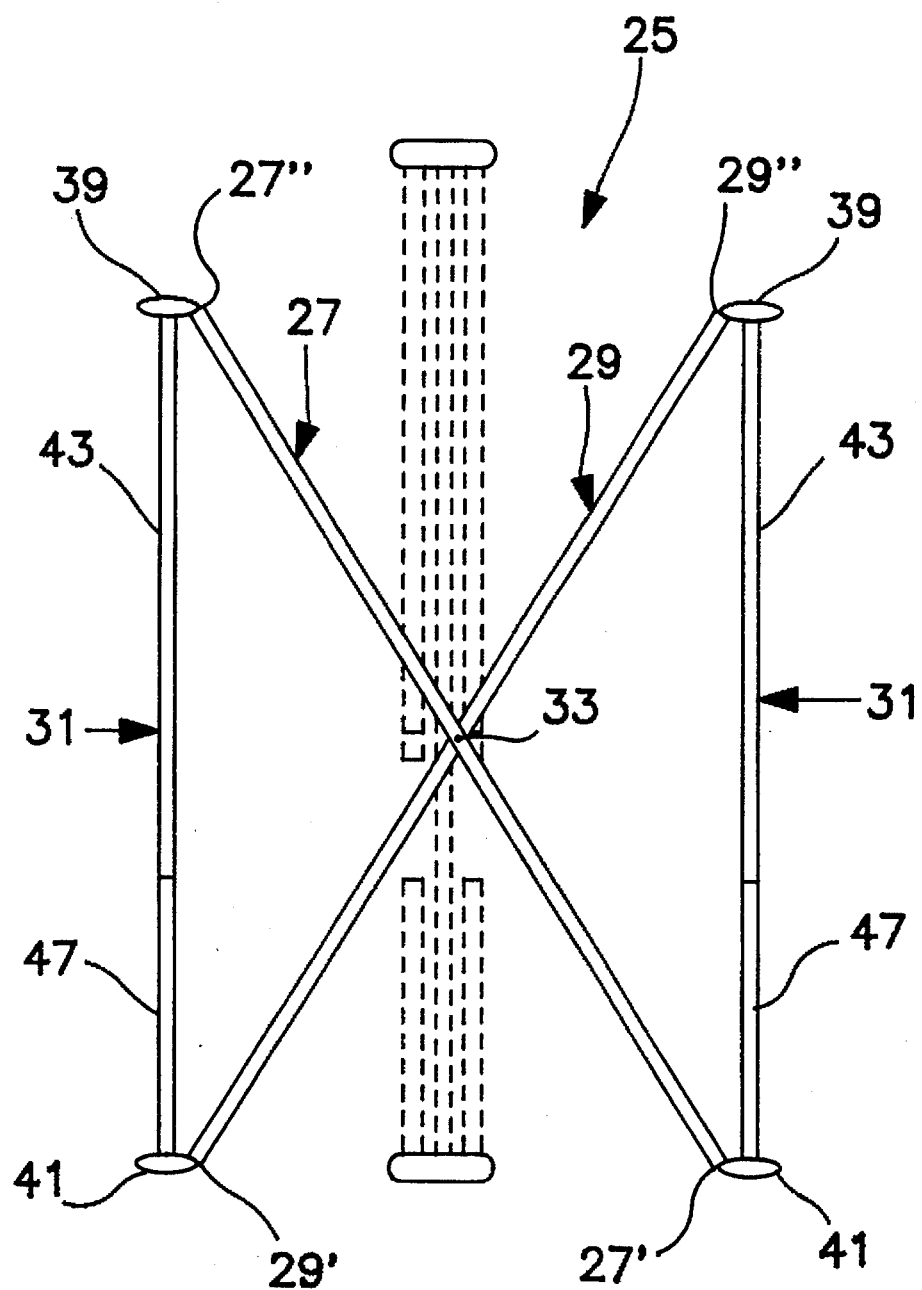
FIG. 3 is a schematic view of a straight strut pair.

With reference to FIGS. 2A, 2B, 2C, 2D which show a curved strut pair 23, and FIG. 3, which shows a straight strut pair 25, each of the strut pairs 23, 25 includes a first and a second strut 27, 29, pivotally connected to each other. The first and second struts 27, 29 each have a first end 27', 29' and a second end 27", 29" and are of the same length. The first ends 27', 29' of the first and second struts 23, 25 and the second ends 27", 29" of the first and second struts move closer to each other when the collapsible beam is moved toward a collapsed condition (FIG. 2D and shown by dotted lines in FIG. and 3). The first ends 27', 29' of the first and second struts of the curved and straight strut pairs 23, 25 are releasably connected in spaced relation by locking members 31 to the second ends 27", 29" of the second and first struts, respectively.

In each collapsible beam according to the present invention, one or more of the strut pairs forming the beam are curved strut pairs 23. It is preferred that at least two curved strut pairs 23 be provided in each collapsible beam because, if only a single curved strut pair is provided, for the ends of the beam to lie on the same line, the struts of the single curved strut pair will have to be substantially parallel when the strut pair is in an expanded condition and, in this condition, the strut pair will not have a thickness dimension of any appreciable size. Collapsible structures formed from collapsible beams preferably have covers on inner and outer sides of the structure, and it is desirable for the strut pairs to have a sufficient thickness dimension to permit running wiring, tubing, and other components in the walls of the collapsible structure, between the covers.

The first and second struts 27, 29 of each curved strut pair 23 are pivotally connected to each other, such as by a pivot pin 33, at points closer to the first ends 27', 29' of the first and second struts than the second ends 27", 29" of the first and second struts. Thus, when the first and second struts 27, 29 are in an expanded condition, a polygon defined by the first and second ends 27', 29', 27", 29" has two parallel sides defined by a line between the first ends of the first and second struts and a line between the second ends of the first and second struts, respectively. The polygon further has two non-parallel sides defined by a line between the first end 27' of the first strut 27 and the second end 29" of the second strut 29, and a line between the first end 29' of the second strut and the second end 27" of the first strut, respectively. As seen in FIGS. 2A, 2B, 2C, and 2D, the struts 27, 29 of the curved strut pairs 23 are preferably pivotally connected to each other at points P offset the same distance D from centerpoints CP of the first and second struts. The distance D may be arbitrarily selected.

As seen in FIGS. 2A, 2B, and 2C, depending upon the length of the locking member 31A, 31B, and 31C provided with the same curved strut pair 23, the shape of the curved strut pair is varied. The angle formed by the two non-parallel sides defined by the line between the first end 27' of the first strut 27 and the second end 29" of the second strut 29, and the line between the first end 29' of the second strut and the second end 27" of the first strut, respectively, is substantially infinitely variable. As a practical matter, as discussed above, the angle will preferably be equal to 180° divided by some whole number, i.e., the (whole) number of curved strut pairs in the collapsible beam. As seen in FIG. 3, the struts 27, 29 of the straight strut pairs 25 are preferably pivotally connected to each other at the centerpoints CP of those struts.

For different ones of the collapsible structures of the family of collapsible structures, each different collapsible structure has a different number of curved strut pairs 23 than any other collapsible structure. The non-parallel sides of the curved strut pairs 23 preferably define an angle that is equal to 180° divided by the number of curved strut pairs forming the collapsible beam, so that ends of first and second struts of strut pairs at opposite ends 35, 37 of the beam define four substantially aligned points, as seen in FIG. 1. If desired or necessary for certain different collapsible structures of the family of collapsible structures, the struts 27, 29 forming the strut pairs 23, 25 may be different in diameter than the struts forming the strut pairs in other ones of the collapsible structures of the family of collapsible structures, but are preferably the same in length as in other ones of the collapsible structures. In this way, additional fixtures for handling different lengths of struts are not necessary, and pivotal connection points for all of the curved strut pairs remain at the same location. As greater numbers of curved strut pairs 23 are used in collapsible beam of a collapsible structure, the struts 27, 29 of each pair come closer and closer to being parallel to the locking members 31. Larger structures using the collapsible beam benefit from the greater strength offered by the strut pairs having the struts 27, 29 in this orientation.

For different collapsible structures of the family of collapsible structures, the locking members 31 are different lengths. Each of the locking members 31 preferably includes an outer hub 39, an inner hub 41, an outer locking shaft 43 fixed at a first end 45 thereof to the outer hub, and an inner locking shaft 47 fixed at a first end 49 thereof to the inner hub. Second ends 51, 53 of the outer and inner locking shafts 43, 47 are preferably releasably lockable to each other. The second ends 51 and 53 are preferably releasably lockable to each other by means such as a pin (not shown) received through holes formed in both the inner and outer locking shafts 43, 47 with one of the inner and the outer locking shaft being telescopingly received in the other one of the outer and the inner locking shaft. The second ends 51 and 53 may also be releasably locked to one another by means of a spring loaded pin mounted in one of the second ends so that it extends transversely from a longitudinal direction of the shaft and is receivable in a corresponding hole in the other one of the shafts. Any other suitable device, such as a threaded or "quick-connect" type connection, may be used for releasably locking the second ends.

The hubs 39, 41 may be generally of the type disclosed in my U.S. Pat. No. 4,280,521, which is incorporated by reference. Such hubs preferably have a two-piece construction for receiving a ring for securing blades attached to ends of the struts thereto and for permitting securing of the inner and outer locking shafts thereto by means of a pin extending through the locking shafts and secured in a corresponding groove in the halves of the hub. My prior U.S. Pat. Nos. 5,444,946, 5,274,980, 5,230,196, 4,761,929, 4,437,275, 4,473,986, 3,968,808, and Re. 33,7190 are representative of the different structures that can be formed with interconnected struts, and of the various parts that may be incorporated in such structures, and are incorporated by reference.

Figure 4A:
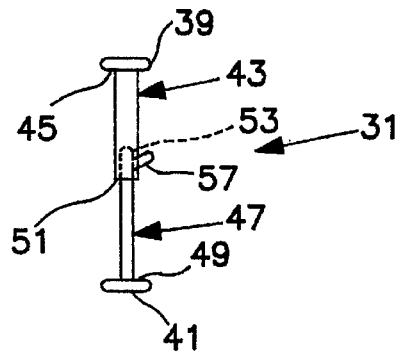
FIGS. 4A and 4B are schematic views of a locking member according to a first embodiment of the present invention.
Figure 4B:
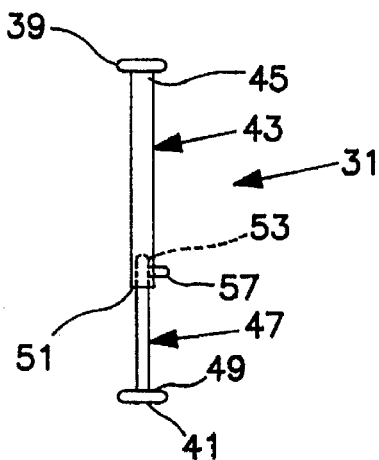
Figure 5A:
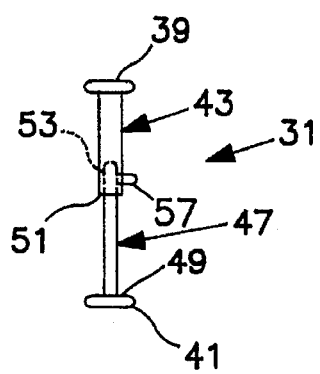
FIGS. 5A and 5B are schematic views of a locking member according to a second embodiment of the present invention.
Figure 5B:
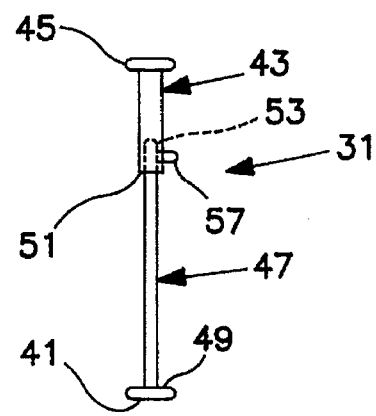
Figure 6:
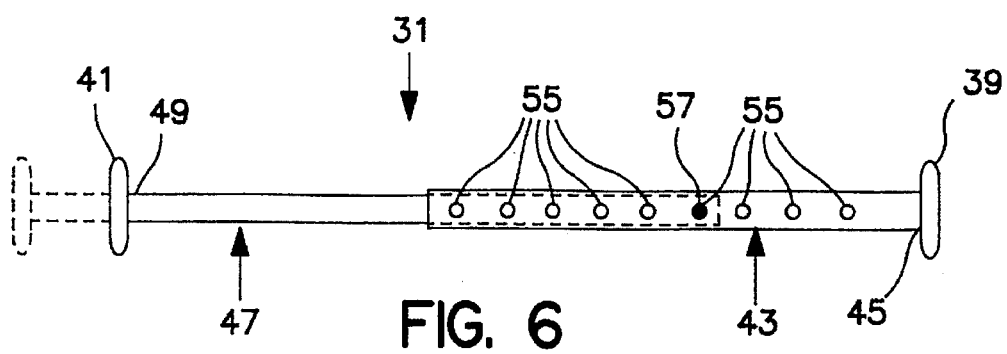
FIG. 6 is a schematic view of a locking member according to a third embodiment of the present invention.

To further minimize structural differences between different collapsible structures of the family of collapsible structures, the inner locking shafts 39 of all of the locking members 31 may, according to an embodiment shown in FIGS. 4A and 4B, be all of the same length, with the outer locking shafts 43 of different collapsible structures of the family of collapsible structures being different in length from one another. Alternatively, according to another embodiment shown in FIGS. 5A and 5B, the outer locking shafts of all of the locking members may be the same length, with the inner locking shafts of different collapsible structures of the family of collapsible structures being different in length. According to yet another embodiment of the present invention, shown in FIG. 6, for each collapsible structure of the family of collapsible structures, outer locking shafts 43 and inner locking shafts 39 of all of the locking members may be all the same length, and each outer locking shaft and inner locking shaft is releasably lockable to a corresponding inner locking shaft and outer locking shaft at a plurality of different positions, such as by providing a plurality of holes 55 for receiving pins or spring loaded pins 57. In this way, for different collapsible structures of the family of collapsible structures, the inner and outer hubs of each locking member are releasably lockable at different distances from each other, permitting use of the same locking member on any collapsible structure of the family of collapsible structures.

In a method for making a family of collapsible structures according to my invention, first and second struts 27, 29 of a number of the curved strut pairs 23 are pivotally connected so that the first and second struts are pivotally connected at points closer to the first ends 27', 29' of the first and second struts than to the second ends 27", 29" of the first and second struts. The number of curved strut pairs 23 for each collapsible structure of the family of collapsible structures corresponds to the type of collapsible structure of the family of collapsible structures being made. At the first and second ends of the plurality of strut pairs 23, 25, locking members 31 of a type corresponding to the type of collapsible structure of the family of collapsible structures being made are provided. The step of pivotally connecting struts 27, 29 of the number of curved strut pairs 23 includes pivotally connecting the number of curved strut pairs at points offset the same distance from centerpoints of the first and second struts.

Where, in a curved strut pair according to the present invention, the length of the struts 27 and 29 are both equal to L, and L is equal to $L_1$ plus $L_2$, where $L_1$ is the distance from the second ends 27" and 29" to the pivot pin 33 and $L_2$ is the distance from the first ends 27' and 29' to the pivot pin, and where the angle formed between the locking members 31 on opposite sides of the strut pair is equal to $2\theta$, where $2\theta$ is preferably equal to 180° divided by some whole number equal to the number of curved strut pairs desired in a particular structure, the length h of the locking member may be determined according to the following equation:

$$h = \sqrt{\{L_1 \cos[180 - 2\tan^{-1}(x \tan \theta)] - L_2\}^2 + \{L_1 \sin[180 - 2\tan^{-1}(x \tan \theta)]\}^2}$$

where $x=(L_1+L_2)/(L_1-L_2)$. The overall dimensions of a particular collapsible structure of a family of collapsible structures can be determined by selecting desired strut lengths and quantities.

While this invention has been illustrated and described in accordance with a preferred embodiment, it is recognized that variations and changes may be made therein without departing from the invention as set forth in the claims.

What is claimed is:

1. A family of two or more collapsible structures, each collapsible structure having a collapsible beam, wherein, for each collapsible structure of the family of collapsible structures, the collapsible beam includes a plurality of strut pairs, each of the strut pairs including a first and a second strut pivotally connected to each other, the first and second struts each having a first end and a second end and being of the same length, the first ends of the first and second struts and the second ends of the first and second struts being moved closer to each other when the collapsible beam is moved toward a collapsed condition, the first ends of the first and second struts of all of the strut pairs being releasably connected in spaced relation by locking members to the second ends of the second and first struts, respectively, one or more strut pairs of the plurality of strut pairs being curved strut pairs, the first and second struts of each curved strut pair being pivotally connected to each other at points closer to the first ends of the first and second struts than the second ends of the first and second struts, wherein ends of first and second struts of strut pairs at opposite ends of the beam define four substantially aligned points, and wherein, for different collapsible structures of the family of collapsible structures, each different collapsible structure has a different number of curved strut pairs than any other collapsible structure of the family of collapsible structures and, for all of the collapsible structures of the family of collapsible structures, the first and second struts of the curved strut pairs are pivotally connected to each other at points offset the same distance from centerpoints of the first and second struts.

2. The family of collapsible structures as set forth in claim 1, wherein, for different collapsible structures of the family of collapsible structures, the locking members are different lengths.

3. The family of collapsible structures as set forth in claim 1, wherein, for at least certain different collapsible structures of the family of collapsible structures, the struts are different in diameter, but the same in length as in other collapsible structures of the family of collapsible structures.

4. The family of collapsible structures as set forth in claim 1, wherein, for at least certain different collapsible structures of the family of collapsible structures, at least some of the strut pairs of the plurality of strut pairs are straight strut pairs having first and second struts pivotally interconnected at centerpoints thereof.

5. The family of collapsible structures as set forth in claim 1, wherein each of the locking members includes an outer hub, an inner hub, an outer locking shaft fixed at a first end thereof to the outer hub, and an inner locking shaft fixed at a first end thereof to the inner hub, second ends of the outer and inner locking shafts being releasably lockable to each other.

6. The family of collapsible structures as set forth in claim 5, wherein, for different collapsible structures of the family of collapsible structures, the locking members are different lengths.

7. The family of collapsible structures as set forth in claim 6, wherein, for each collapsible structure of the family of collapsible structures, inner locking shafts of all of the locking members are the same length, and outer locking shafts of different collapsible structures of the family of collapsible structures are different in length.

8. The family of collapsible structures as set forth in claim 6, wherein, for each collapsible structure of the family of collapsible structures, outer locking shafts of all of the locking members are the same length, and inner locking shafts of different collapsible structures of the family of collapsible structures are different in length.

9. The family of collapsible structures as set forth in claim 6, wherein, for each collapsible structure of the family of collapsible structures, outer locking shafts and inner locking shafts of all of the locking members are the same length, and the outer locking shaft and inner locking shaft of each locking member are releasably lockable to each other at a plurality of different positions so that, for different collapsible structures of the family of collapsible structures, the inner and outer hubs of each locking member are releasably lockable at different distances from each other.

10. The family of collapsible structures as set forth in claim 9, wherein one of the inner and outer locking shafts is telescopingly received in the other of the outer and inner locking shafts.

11. The family of collapsible structures as set forth in claim 6, wherein one of the inner and outer locking shafts is telescopingly received in the other of the outer and inner locking shafts.

12. A method of making a family of two or more different collapsible structures, each collapsible structure of the family of collapsible structures having a collapsible beam, wherein, for each collapsible structure of the family of collapsible structures, the collapsible beam includes a plurality of strut pairs, each of the strut pairs including a first and a second strut pivotally connected to each other, the first and second struts each having a first end and a second end and being of the same length, the first ends of the first and second struts and the second ends of the first and second struts being moved closer to each other when the collapsible beam is moved toward a collapsed condition, the first ends of the first and second struts of all of the strut pairs being releasably connected in spaced relation by locking members to the second ends of the second and first struts, respectively, one or more strut pairs of the plurality of strut pairs being curved strut pairs, the first and second struts of each curved strut pair being pivotally connected to each other at points closer to the first ends of the first and second struts than the second ends of the first and second struts, wherein ends of first and second struts of strut pairs at opposite ends of the beam define four substantially aligned points, and wherein, for different collapsible structures of the family of collapsible structures, each different collapsible structure of the family of collapsible structures has a different number of curved strut pairs than any other collapsible structure of the family of collapsible structures, comprising the steps of:

pivotally connecting first and second struts of a number of the curved strut pairs so that the curved strut pairs are pivotally connected at points closer to the first ends of the first and second struts than the second ends of the first and second struts, the number of curved strut pairs corresponding to the type of collapsible structure of the family of collapsible structures being made, wherein the step of pivotally interconnecting the number of curved strut pairs includes pivotally connecting the number of curved strut pairs at points offset the same distance from centerpoints of the first and second struts.

13. The method as set forth in claim 12, comprising the further step of providing, at the first and second ends of the plurality of strut pairs, locking members of a type corresponding to the type of collapsible structure of the family of collapsible structures being made.

* * * * *